July 11, 1933.  E. P. CRESSLER  1,917,433
ANGLE MARKING MEANS
Filed Feb. 5, 1929
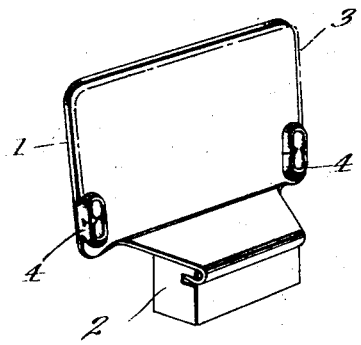
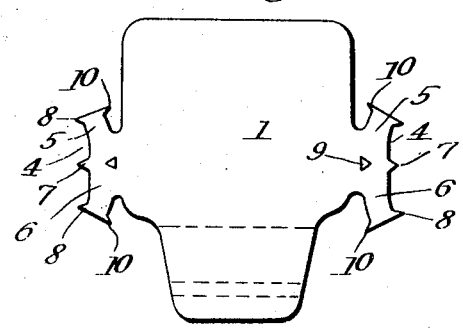
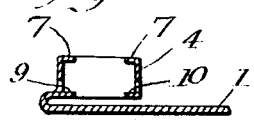
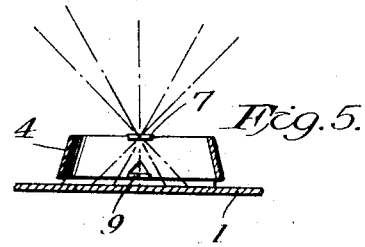
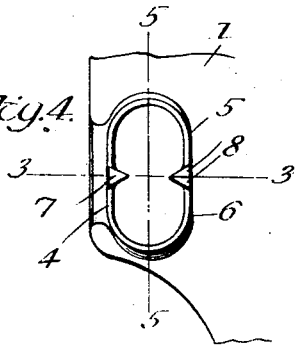
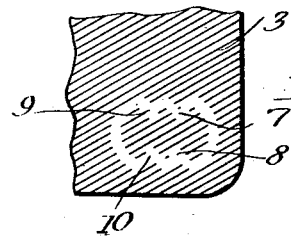
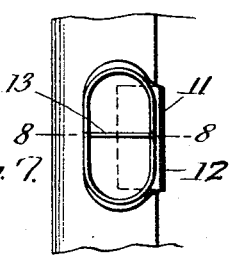
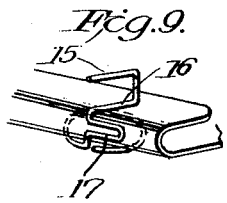
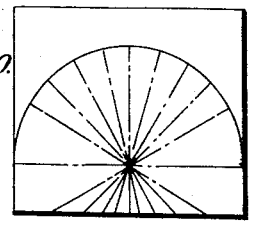
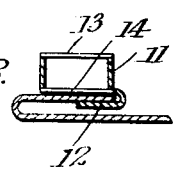
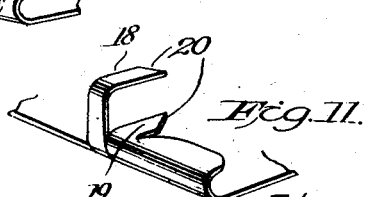
Inventor
Edward P. Cressler
By Mawson, Kennedy Campbell
Attorneys Patented July 11, 1933

1,917,433

UNITED STATES PATENT OFFICE

EDWARD P. CRESSLER, OF NEWTON, KANSAS

ANGLE MARKING MEANS

Application filed February 5, 1929. Serial No. 337,681.

This invention relates to improvements in angle marking means and, particularly, to such means adapted to be used in connection with X-ray films.

In the taking of X-ray pictures, it is desirable and often necessary to know the exact angle at which the X-rays impinged upon the film in order that the picture produced thereon may be viewed at the proper angle, that is to say, at the same angle at which the picture was taken. It has heretofore been proposed to provide the X-ray apparatus with means for indicating the angle at which a picture is taken, but in the use of such means, it is, of course, necessary to make written records of the angle at which a picture has been taken. The use of such means is not productive of the best results, especially if the X-ray pictures are taken for the use of dental surgeons, in which case, as a rule, a number of pictures of different areas of a patient's mouth are taken at various angles. In such cases it is, of course, necessary with the means now at hand to make a written record of the angle at which each of said pictures was taken. Such records may become lost and, in any event, the surgeon is required to identify each of the films or pictures with the written record of the angle at which the picture was taken.

In modern dentistry, it is becoming the practice to take X-ray pictures of a patient's mouth in pairs, to be subsequently viewed through a stereoscope. When films are thus used, it is essential that the observer look at the film at exactly the same angle at which the picture was taken. With the angle marking means of my invention as hereinafter described, the operator is enabled to adjust these stereoscopic views to the proper angle without referring to any written records, the angle being indicated directly upon the film.

It is the principal object of this invention to provide means to be employed in association with an X-ray film whereby the angle at which a picture is taken will be directly indicated on the film, thus dispensing with the need of keeping records, as has been the practice heretofore.

Another object of the invention is to provide an angle marking means of the character set forth, which is made of a material impervious to X-rays and which will, therefore, when used in connection with an X-ray film, leave a portion thereof unexposed, said unexposed portion providing the means for indicating the angle at which the exposure was made.

A further object of the invention is to provide an angle marking means for X-ray films of the character set forth, which may readily be associated with a film-holder of usual construction and which is also adapted to be directly connected to a film when a holder is not used.

Other and further objects of the invention, as well as the many advantages attendant upon the use thereof, will be more clearly brought out as the description proceeds.

In the accompanying drawing, I have illustrated several practical embodiments of my invention, but it is to be understood that these illustrations are by way of example only, and that the invention is not confined to the structural details therein disclosed. Many other modifications will readily suggest themselves to those skilled in the art, and these may be made without departing from the scope of the invention as defined in the appended claims.

In the drawing:

Fig. 1 is a perspective view of a film-holder with an X-ray film supported therein, and illustrating one embodiment of my angle marking means;

Fig. 2 is a plan view of the blank from which the film-holder illustrated in Fig. 1 is made;

Fig. 3 is a fragmentary cross-sectional view of a corner of the structure illustrated in Fig. 1, and showing particularly the angle marking means, said view being taken substantially on line 3—3 of Fig. 4;

Fig. 4 is a plan view on an enlarged scale, showing an angle marking device according to my invention;

Fig. 5 is a sectional view, taken on line 5—5 of Fig. 4, and illustrates diagrammatically the function and operation of the angle marking device;

Fig. 6 is a fragmentary view of an exposed X-ray film showing the angle marking means thereon;

Fig. 7 is a fragmentary plan view of a modified form of the angle marking means;

Fig. 8 is a sectional view, taken on line 8—8 of Fig. 7;

Fig. 9 is a fragmentary perspective view of still another modified form;

Fig. 10 is a plan view of a chart to be used in connection with exposed films to indicate the exact angle disclosed by the angle marking means on the film; and Fig. 11 is a fragmentary plan view of a further modification of the angle marking means.

Referring now to the drawing, the reference-numeral 1 indicates a film-holder for X-ray films which is provided with a biting element 2, an X-ray film 3 being adapted to be supported in said holder, as indicated in Fig. 1.

The angle marking means of my invention are designated, generally, by the reference-numeral 4 (Fig. 1) and, as will be seen from the drawing, one such means is disposed in each of the lower corners of the film-holder and overlying the film at that point.

The angle marking means 4, in the embodiment illustrated in Figs. 1 to 4, is made integral with the film-holder 1. A plan view of the blank from which the holder and the angle marking means are made is disclosed in Fig. 2. As will be seen from an inspection of the figure referred to, the angle marking means 4 comprise portions 5 and 6, which, when the blank is formed to shape, are bent towards each other, forming what may be described as an eyelet or ring.

The top edge of the ring just described is provided with integral projections 7 and 8 which project inwardly from the sides of the ring and towards each other, as clearly shown in Figs. 1 and 4. Near the base of the ring member, the blank is provided with a V-shaped cut 9, the material being adapted to be bent out from the body of the blank to form an inwardly-projetcing point, as shown in Figs. 3 and 4. The bottom of the ring member is formed with projections 10 which, when the ring member is bent to shape, project inwardly towards the center of the ring, thus pointing towards the projection 9, as shown in Fig. 3.

The structure described may therefore be said to be in the form of a ring or eyelet having projections extending inwardly from the opposite sides thereof and at the top and bottom thereof. This ring member is made of a material which is impervious to X-rays; that is to say, it may be made of any base metal through which X-rays do not pass.

It will now be understood that when an X-ray film is exposed while supported in the holder heretofore described and with the angle marking means overlying the film, this last-mentioned means will leave upon the film an unexposed portion, as illustrated in Fig. 6. It is understood that the projections 7 and 8 at the top of the ring member are in alinement with the projections 9 and 10 at the base thereof. It will now be clear that if the X-rays impinge upon the film in a direction which is in alinement with the projections at the top and bottom of the ring member, these projections will be superposed, and, hence, will appear only as single points upon the film. When, however, the X-rays impinge upon the film at an angle, as illustrated by the dotted lines in Fig. 5, the projections on the upper part of the ring will be displaced upon the film relative to the projections at the bottom of the ring. This position of displacement of the projections is illustrated in Fig. 6. It will also be understood that the degree or amount of displacement of the projections 7 and 8 with respect to the projections 9 and 10 will vary directly as the angle at which the X-rays impinge upon the film. Thus, a film exposed as has been described, may be placed upon any convenient angle-measuring device, such as the chart or protractor illustrated in Fig. 10, and the exact angle at which the picture was taken can immediately and readily be determined according to the radial distance between the marks produced on the film by the projections 7 and 9 and 8 and 10.

Thus, I have provided a means for indicating directly upon an X-ray film the angle at which the picture was taken. This indication will, of course, be permanent when the film has been developed.

In Fig. 7, I have illustrated a modified form of the angle marking means of my invention, the structure in this case comprising a member 11 which may be detachably connected to film-holders now in use by means of the flange 12 which engages under the flange of such film-holders. In this embodiment of the invention, the projections 7, 8, 9 and 10 of the form heretofore described are dispensed with, and in their place I provide a small bar 13 at the top and 14 at the bottom, it being understood that said bars as well as the member 11 are made of material which is impervious to X-rays.

The operation and function of the modified form just described is exactly the same as that of the first embodiment described, with the exception that in this later embodiment the angle marking means may be removed from the film-holder, whereas in the first embodiment they are made integral therewith.

In Fig. 9, I have illustrated a further modification of the invention. In this modification, the angle marking device is made of a single length of wire of material impervious to X-rays and bent to shape so that it can be clipped over the edge of a film or of a holder, whichever may be desired. The wire comprises portions 15 and 16, which correspond in location and operation to the bars 13 and 14 of the modification illustrated in Fig. 7. In order that this angle marking means may be retained securely on the edge of the film or the holder, as the case may be, a portion of the wire is bent out, as shown at 17, to form an abutment which will maintain the marking means rigidly in position.

In Fig. 11, I have shown a still further modification of my invention. In this form, the angle marking device 4 comprises a pair of parallel projections 18 and 19 made integral with the holder and extending inwardly from the edge thereof. These projections are in different planes corresponding to the relative positions of projections 7 and 9 of the structure shown in Fig. 3. It will be noted, however, that the construction differs from that shown in Fig. 3, in that only the inner edges of the projections 18 and 19 are in alinement. The ends of the projections are cut at a bias, as shown at 20, so that when the angle at which the X-rays impinge upon the film is such that the projections appear to lap, the angle may be readily measured on a protractor according to the radial distance between the inner-edge points, the edge of the film holder being positioned along the baseline of the protractor.

It is believed that the many advantages of my invention will now be readily appreciated by those skilled in the art. It will be apparent that by the use of my invention, a permanent record of the angle at which an X-ray picture has been taken may be made directly upon the X-ray film, thus obviating the use of any other records for this purpose. The result will be of advantage in any sort of X-ray work, and is particularly advantageous when the X-ray films are to be viewed stereoscopically, because in such a case it is essential that the film be observed from the same angle at which the picture was taken.

I claim:

1. An angle indicating marking device for X-ray films comprising a body-portion, projections extending inwardly from opposite sides at the top and bottom of said body-portion, said projections being in alinement and producing markings on the film measuring the angle at which the X-rays impinge thereon.

2. The combination with an X-ray film of a holder therefor, an angle-indicating marking device on the holder comprising a pair of spaced elements located one above the other over the film and adapted to be registered thereon, whose projection on the film measures the angle at which the X-rays impinge thereon.

3. The combination with an X-ray film of a holder therefor, an angle-indicating marking device on the holder, said device being impervious to X-rays, and comprising a pair of spaced elements located one above the other over the film, whose projection on the film measures the angle at which the X-rays impinge thereon.

4. The combination with an X-ray film of a holder therefor and an angle-indicating marking device on the holder, said device being impervious to X-rays and comprising a pair of spaced elements overlying each other and the film to produce markings on the film measuring the angle at which the X-rays impinged.

5. An angle-indicating marking device for X-ray films adapted to be attached to the film, comprising a body impervious to X-rays, aligned projections extending from said body for leaving portions of the film unexposed, the unexposed portions of the film measuring the angle at which the X-rays impinged thereon.

6. An angle-indicating marking device for X-ray films including spaced elements adapted to produce markings on a film, said device being positionable over a film with one marking element above the other so that the projections of said elements measure the angle at which X-rays impinge on the film.

7. An angle-indicating marking device for X-ray films adapted to be attached thereto, the same comprising a wire clip having portions parallel to the face of the film and in alignment with each other, the radiographic projections of which are adapted to be displaced on the film, the displacement indicating the angle at which the X-rays impinged on the film.

8. An angle-indicating marking device for X-ray films comprising a film holder and a member attached thereto provided with spaced marking means, the radiographic projections of which are adapted to be relatively displaced on the film to indicate the angle at which the X-rays impinged thereon.

9. An angle-indicating marking device for X-ray films comprising a body-portion impervious to X-rays, and integral angle-marking aligned projections on said body-portion projectable on the film to produce markings measuring the angle at which the X-rays impinge.

10. The combination with a film, of a holder and a film marking device integral with the holder for producing markings on the film measuring the angle at which the X-rays impinge thereon, the marking device comprising spaced fingers, the edges of which are in alignment.

11. The combination with a film-holder having a flange adapted to overlie a film of a marking device integrally united to said flange, the same comprising spaced projections in alignment over the film for producing markings thereon measuring the angle at which the X-rays impinge.

12. The combination with a holder for X-ray films of a marking device secured to the holder for producing markings on the film measuring the angle at which the X-rays impinged thereon, the same comprising a body portion, projections in different planes from said body portion adapted to overlie a film, an edge of one projection being in alignment with an edge of the other.

13. The combination with an X-ray film-holder having a flange adapted to overlie a film, of a marking device secured to said flange for radiographically producing markings on the film measuring the angle at which the X-rays impinged thereon, the same comprising an elliptical body portion having aligned projections extending inwardly from opposite sides at the top and bottom of said body portion.

14. An angle-indicating marking device for X-ray films comprising a member impervious to X-rays, said member being interposed between a film and an X-ray apparatus to produce a radiographic projection on the film indicating the angle at which the X-rays impinged thereon, the same comprising a body portion having aligned projections extending therefrom in different planes.

15. An angle-indicating marking device for X-ray films comprising a body portion, a pair of spaced projections extending therefrom and impervious to X-rays, said projections being in alignment and positionable between a film and an X-ray apparatus, whereby radiographic projections of said members will be produced on the film to indicate the angle at which the X-rays impinged thereon.

16. An angle-indicating marking device adapted to be attached to X-ray films comprising a body portion, projections extending from said body portion and in different planes and having edges in alignment and adapted to produce markings on the film measuring the angle at which the X-rays impinge thereon.

In testimony whereof, I affix my signature.

EDWARD P. CRESSLER.